(12) United States Patent
Hirose

(10) Patent No.: US 6,550,970 B2
(45) Date of Patent: Apr. 22, 2003

(54) LINEAR BEARING

(76) Inventor: Kazuya Hirose, Bentencho 82-2, Shinjuku-ku, Tokyo (JP)

( * ) Notice: Subject to any disclaimer, the term of this patent is extended or adjusted under 35 U.S.C. 154(b) by 0 days.

(21) Appl. No.: 09/843,098

(22) Filed: Apr. 27, 2001

(65) Prior Publication Data

US 2002/0159658 A1 Oct. 31, 2002

(51) Int. Cl.$^7$ .............................................. F16C 29/04
(52) U.S. Cl. .............................. 384/50; 384/52; 384/56
(58) Field of Search .............................. 384/56, 55, 53, 384/52, 51, 50, 46; 464/167, 168

(56) References Cited

U.S. PATENT DOCUMENTS

| | | | | |
|---|---|---|---|---|
| 2,889,180 A | * | 6/1959 | Jorgensen | 384/52 |
| 3,353,876 A | * | 11/1967 | Moyer | 384/43 |
| 3,365,914 A | * | 1/1968 | Asher | 384/55 |
| 3,490,251 A | * | 1/1970 | Roethlisberger | 464/167 |
| 5,051,000 A | * | 9/1991 | Cadwallader et al. | 384/56 |
| 5,489,253 A | * | 2/1996 | Ito et al. | 384/51 |

* cited by examiner

Primary Examiner—Thomas R. Hannon

(57) ABSTRACT

A linear bearing that can be used in applications requiring high rigidity, such as guide posts of presses and molds is composed of a guide shaft, an outer cylinder capable of moving in the axial direction relatively to the guide shaft outside the guide shaft, numerous rolling elements interposed between the guide shaft and the outer cylinder, and a cage provided between the guide shaft and the outer cylinder for retaining said numerous rolling elements disposed in the circumferential direction and in the axial direction, characterized in that each of the rolling elements is a roller having a convex circular arc surface of revolution formed on the cylindrical surface thereof, that the inner surface of the outer cylinder is formed as a cylindrical surface, that the outer surface of the guide shaft is provided with axially extending guide grooves, each having a concave cylindrical surface, corresponding to the respective rows of rollers disposed in the axial direction, that the radius of the circle constituting the circular arc surface of revolution of each of the rollers is kept slightly smaller than the radius of the circle constituting the cylindrical surface of the outer cylinder and the radius of the circle constituting the concave cylindrical surface of each of the grooves formed in the guide shaft, and that the pitch of the rollers disposed in the circumferential direction is kept smaller than twice the width of each roller.

In this linear bearing, it is optimum that the width of each of the rollers is kept smaller than the outer diameter of the roller.

In this constitution, a linear bearing that has higher rigidity, can be produced easily, is lower in production cost, and can be easily assembled with a mating apparatus, compared with the conventional linear bearings can be provided.

8 Claims, 5 Drawing Sheets

LINEAR BEARING

FIELD OF THE INVENTION

This invention relates to a linear bearing, particularly a linear bearing that can be used in applications requiring high rigidity, such as guide posts of presses and molds.

BACKGROUND OF THE INVENTION

A linear bearing that provides a mechanism for linear movement along a shaft consists of a guide shaft, an outer cylinder capable of moving in the axial direction relatively to the guide shaft outside the guide shaft, numerous rolling elements interposed between the guide shaft and the outer cylinder, and a cage provided between the guide shaft and the outer cylinder for retaining said numerous rolling elements disposed in the circumferential direction and in the axial direction. The rolling elements used include balls, rollers, needle rollers, etc.

In a linear bearing using balls as the rolling elements, since the outer surface of the guide shaft and the inner surface of the outer cylinder for having the balls interposed between them are formed as smooth cylindrical surfaces, the relative motion between the outer cylinder and the guide shaft around the axis is free, to provide an advantage that assembling is easy. However, since the contacts of the balls as the rolling elements with the inner surface of the outer cylinder and the outer surface of the guide shaft are point contacts, the rigidity is likely to be insufficient disadvantageously. The rigidity can be enhanced by a method of increasing the number of balls interposed between the outer cylinder and the guide shaft, but there is a limit in the number of interposed balls. So, there is also a limit in the rigidity that can be achieved.

On the other hand, in a linear bearing using rollers as the rolling elements, the inner surface of the outer cylinder and the outer surface of the guide shaft are formed to have flat and parallel rolling faces, and the rollers are interposed between these flat and parallel rolling faces. In this case, since the contacts of the rollers with the respective flat rolling faces are line contacts, the rigidity can be enhanced compared to the abovementioned linear bearing using balls as the rolling elements. However, forming the flat and parallel rolling faces on the inner surface of the outer cylinder and the outer surface of the guide shaft requires an advanced machining technique, to raise the production cost. Furthermore, in this case, the relative motion between the outer cylinder and the guide shaft around the axis is not free. So, when the guide shaft and the outer cylinder are assembled with the respective components of a mating apparatus, those components must be accurately positioned and complicatedly adjusted very inconveniently.

SUMMARY OF THE INVENTION

The object of this invention is to solve the abovementioned problems of the prior art, by providing a linear bearing that has high rigidity, can be easily produced, can be kept low in production cost, and can be easily assembled with a mating apparatus.

To achieve the above object, this invention proposes, first of all, a linear bearing, that is composed of a guide shaft, an outer cylinder capable of moving relatively to the guide shaft in the axial direction outside the guide shaft, numerous rolling elements interposed between the guide shaft and the outer cylinder, and a cage provided between the guide shaft and the outer cylinder for retaining said numerous rolling elements disposed in the circumferential direction and in the axial direction, characterized in that each of the rolling elements is a roller having a convex circular arc surface of revolution formed on the cylindrical surface thereof, that the inner surface of the outer cylinder and the outer surface of the guide shaft are formed as cylindrical surfaces respectively, that the radius of the circle constituting the circular arc surface of revolution of each of the rollers is kept slightly smaller than the radius of the circle constituting the cylindrical surface of the outer cylinder, and that the pitch of the rollers disposed in the circular direction is smaller than twice the width of each roller.

In the linear bearing as the above subject matter of this invention, the circular arc surfaces of revolution fonned on the cylindrical surfaces of the rollers are kept in contact with the cylindrical inner surface of the outer cylinder and the cylindrical outer surface of the guide shaft, and since the circular arc surfaces of revolution formed on the cylindrical surfaces of the rollers are adapted to the inner cylindrical surface of the outer cylinder, the contacts between the rollers and the outer cylinder can be considered to be substantially line contacts. So, the rigidity can be kept high. Furthermore, since the inner surface of the outer cylinder and the outer surface of the guide shaft can be formed as cylindrical surfaces, the forming work is easy and can keep the production cost low.

Moreover, because of the constitution as described above, in which the inner surface of the outer cylinder and the outer surface of the guide shaft are cylindrical surfaces and in which the circular arc surfaces of revolution of the rollers contact the outer cylinder and the guide shaft, the outer cylinder and the guide shaft can rotate relatively to each other around the axis, that is, the relative motion around the axis is free. So, the linear bearing can be easily assembled with a mating apparatus.

Furthermore, since the pitch of rollers disposed in the circular direction is smaller than twice the width of each roller, more rollers can be disposed along the circumference with the same diameter. So, compared with the conventional constitution in which the pitch of the rollers disposed in the circumferential direction is larger than twice the width of each roller, higher rigidity can be obtained if the diameter of the circumference along which the rollers are disposed is the same, or the diameter of the circumference can be made smaller, that is, the outer cylinder can be downsized, if it is intended to achieve equivalent rigidity.

This invention also proposes a linear bearing, that is composed of a guide shaft, an outer cylinder capable of moving in the axial direction relatively to the guide shaft outside the guide shaft, numerous rolling elements interposed between the guide shaft and the outer cylinder, and a cage provided between the guide shaft and the outer cylinder for retaining said numerous rolling elements disposed in the circumferential direction and in the axial direction, characterized in that each of the rolling elements is a roller having a convex circular arc surface of revolution formed on the cylindrical surface thereof, that the inner surface of the outer cylinder is formed as a cylindrical surface, that the outer surface of the guide shaft is provided with axially extending guide grooves, each having a concave cylindrical surface, corresponding to the respective rows of the rollers disposed in the axial direction, that the radius of the circle constituting the circular arc surface of revolution of each of the rollers is kept slightly smaller than the radius of the circle constituting the cylindrical surface of the outer cylinder and the radius of the circle constituting the concave cylindrical surface of each of the grooves formed in the guide shaft, and that the pitch of the rollers disposed in the circumferential direction is kept smaller than twice the width of each roller.

In the linear bearing as this subject matter of this invention, since the circular arc surfaces of revolution formed on the cylindrical surfaces of the rollers contact the inner cylindrical surface of the outer cylinder and the concave cylindrical surfaces of the guide grooves of the guide shaft, the contacts of the circular arc surfaces of revolution of the rollers with the inner surface of the outer cylinder and the guide grooves of the guide shaft can be considered to be substantially line contacts. So, compared with the previous subject matter, this subject matter allows higher rigidity to be achieved.

In this subject matter of the present invention, as described above, in order to further enhance the rigidity, the guide shaft has guide grooves formed, each having a concave cylindrical surface. However, since it is only required that the guide grooves are formed on the outer surface of the guide shaft, the pitch accuracy of the guide grooves around the guide shaft is not so important, and the forming work is easy. In addition, the inner surface of the outer cylinder is a cylindrical surface. So, since the outer cylinder and the guide shaft can rotate relatively to each other around the axis, that is, the relative motion around the axis is free, the linear bearing can be easily assembled with a mating apparatus.

Also in this subject matter of the invention, as in the previous subject matter, the pitch of the rollers disposed in the circumferential direction is kept smaller than twice the width of each roller. Therefore, more rollers can be disposed along the circumference with the same diameter. So, compared with the conventional constitution in which the pitch of the rollers disposed in the circumferential direction is larger than twice the width of each roller, higher rigidity can be achieved if the diameter of the circumference along which the rollers are disposed is the same, or the diameter of the circumference can be made smaller, that is, the outer cylinder can be downsized, if it is intended to achieve equivalent rigidity.

In the subject matters described above, this invention also proposes a constitution in which each of the rollers has a width smaller than its diameter.

In this subject matter of the invention, since further more rollers can be disposed along the circumference with the same diameter, further higher rigidity can be achieved if the diameter of the circumference along which the rollers are disposed is the same, or the diameter of the circumference can be made further smaller, that is, the outer cylinder can be further downsized, if it is intended to achieve equivalent rigidity.

In the invention described above, it is suitable that the radius of the circle constituting the circular arc surface of revolution of each roller is set at 93% to 96% of the radius of the circle constituting the cylindrical surface of the outer cylinder.

Furthermore, in the invention described above, it is suitable that the radius of the circle constituting the concave cylindrical surface of each guide groove is set at 1.04 to 1.08 times the radius of the circle constituting the circular arc surface of revolution of each roller, Moreover, in the invention described above, it is suitable that the radius of the circle constituting the concave cylindrical surface of each of the guide grooves of the guide shaft is set to be equal to the radius of the circle constituting the cylindrical surface of the outer cylinder, but they can also be different, as the case may be.

DETAILED DESCRIPTION OF THE PREFERRED EMBODIMENTS

Figure 1:
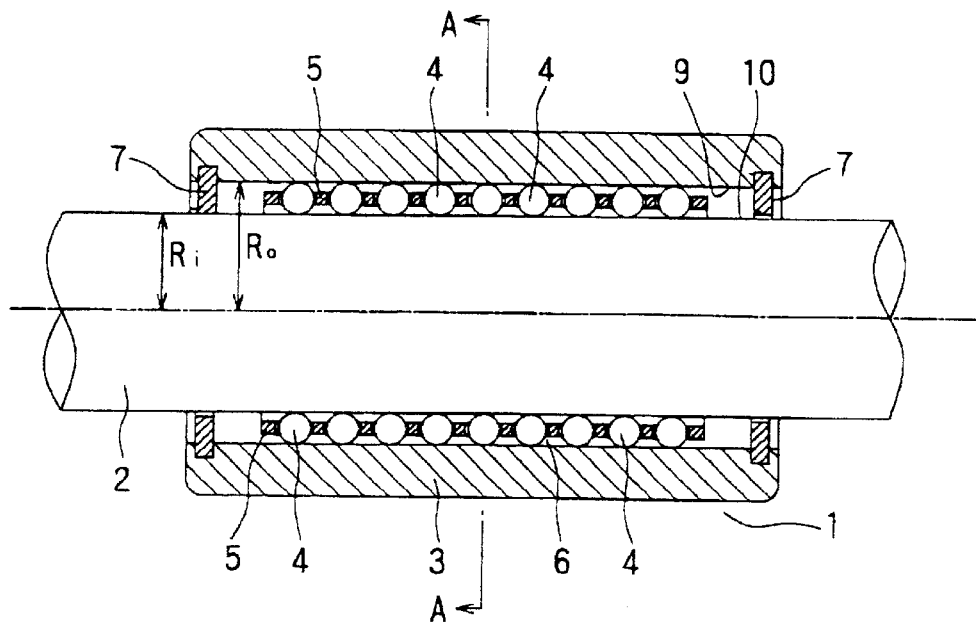
FIG. 1 is a vertical sectional view showing a first suitable particular example of the linear bearing of this invention.

Preferable embodiments of this invention are described below in more detail in reference to attached FIGS. 1 through 8.

In FIGS. 1 through 4 showing a first embodiment, symbol 1 generally denotes a linear bearing. The linear bearing 1 is composed of a guide shaft 2, an outer cylinder 3 capable of moving in the axial direction relatively to the guide shaft 2 outside the guide shaft 2, numerous rollers 4 as rolling elements interposed between the guide shaft 2 and the outer cylinder 3, and a cage 5 provided between the guide shaft 2 and the outer cylinder 3 for retaining the numerous rollers 4 disposed in the circumferential direction and in the axial direction. The cage 5 has a cylindrical form in which numerous retaining holes 6 are arranged in the circumferential direction and in the axial direction, and the numerous rollers 4 are engaged with the retaining holes 6.

Figure 2:
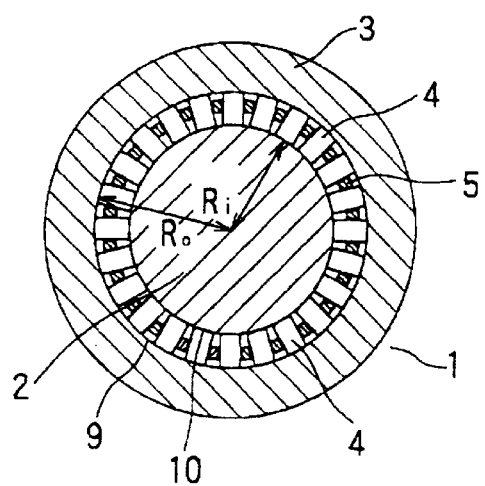
FIG. 2 is the A—A sectional view of FIG. 1.

In this embodiment, nine rollers 4 are disposed in each row in the axial direction as shown in FIG. 1, and twenty-four rollers 4 are disposed in each row in the circumferential direction as shown in FIG. 2. Furthermore, in this embodiment, locating snap rings 7 are installed inwardly at both the ends of the outer cylinder 3.

Figure 3:
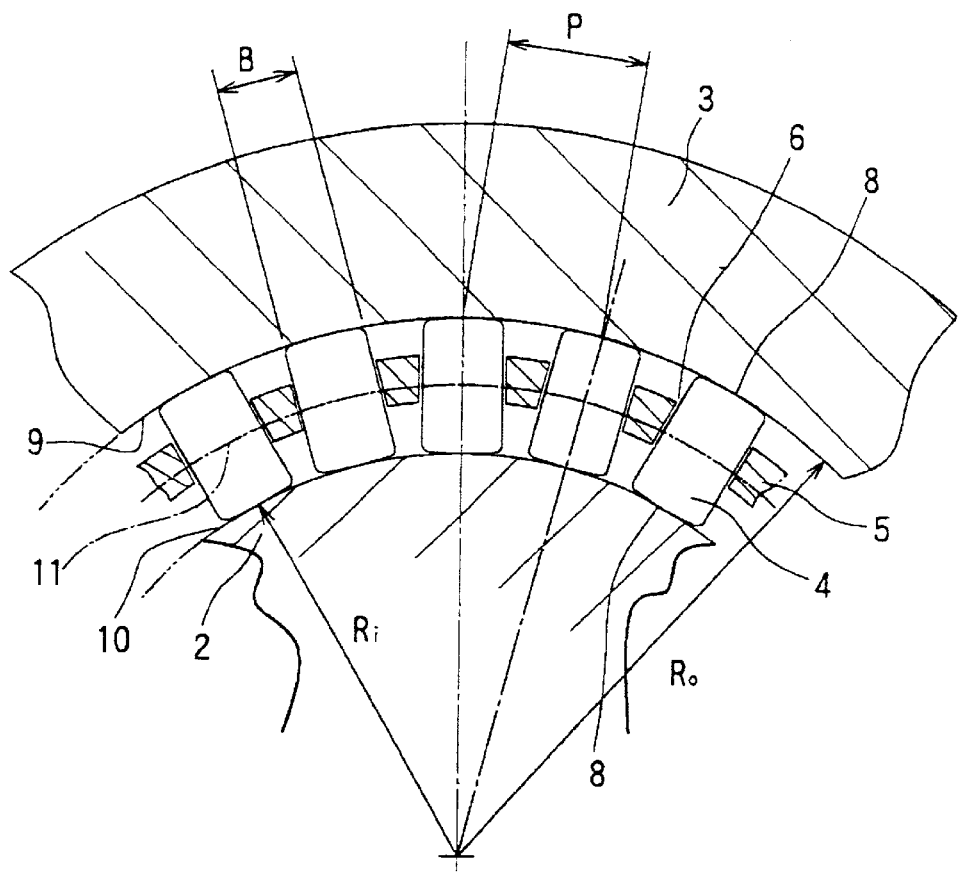
FIG. 3 is an expanded illustration showing a part of FIG. 2.

As shown in FIG. 3, the inner surface 9 of the outer cylinder 3 and the outer surface 10 of the guide shaft 2 are respectively formed as cylindrical surfaces, and the radii of the circles constituting the cylindrical surfaces are expressed as Ro and Ri respectively in the drawing.

On the other hand, each of the rollers 4 as rolling elements has a convex circular arc surface of revolution 8 formed on the cylindrical surface thereof. The radius of the circle constituting the circular arc surface of revolution 8 is expressed as R in the drawing. The radius R of the circle constituting the circular arc surface of revolution 8 of each roller 4 is set to be slightly smaller than the radius Ro of the circle constituting the cylindrical surface 9 of the outer cylinder 3, and for example, it is suitable that the radius R is set at 93% to 96% of the radius Ro.

That is, the relation between the radii R and Ro can be expressed by the following formula:

$$R=(0.93\sim0.96)\times Ro$$

Figure 4:
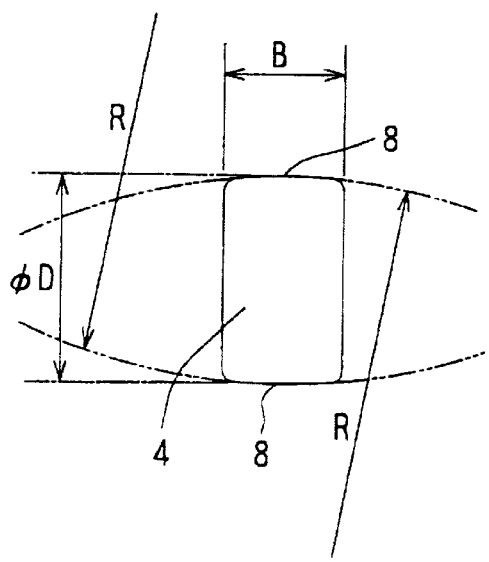
FIG. 4 is an expanded illustration showing a roller only of FIG. 3.
Figure 5:
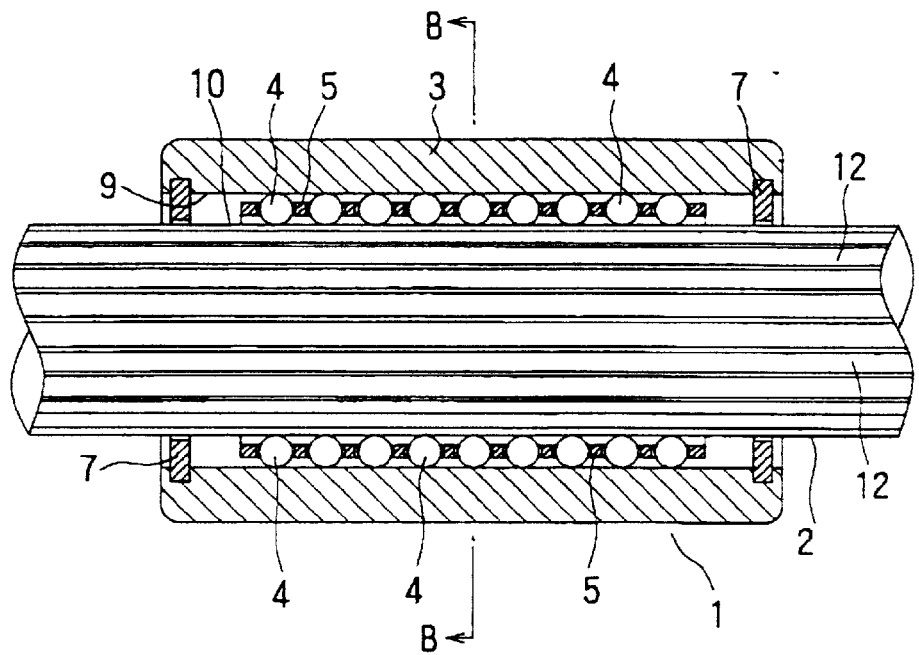
FIG. 5 is a vertical sectional view showing a second suitable particular example of the linear bearing of this invention.
Figure 6:
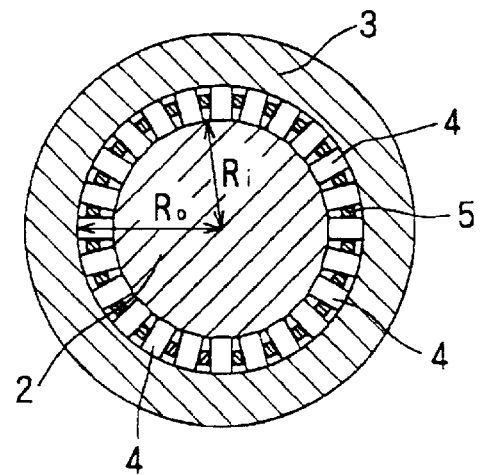
FIG. 6 is the B—B sectional view of FIG. 5.
Figure 7:
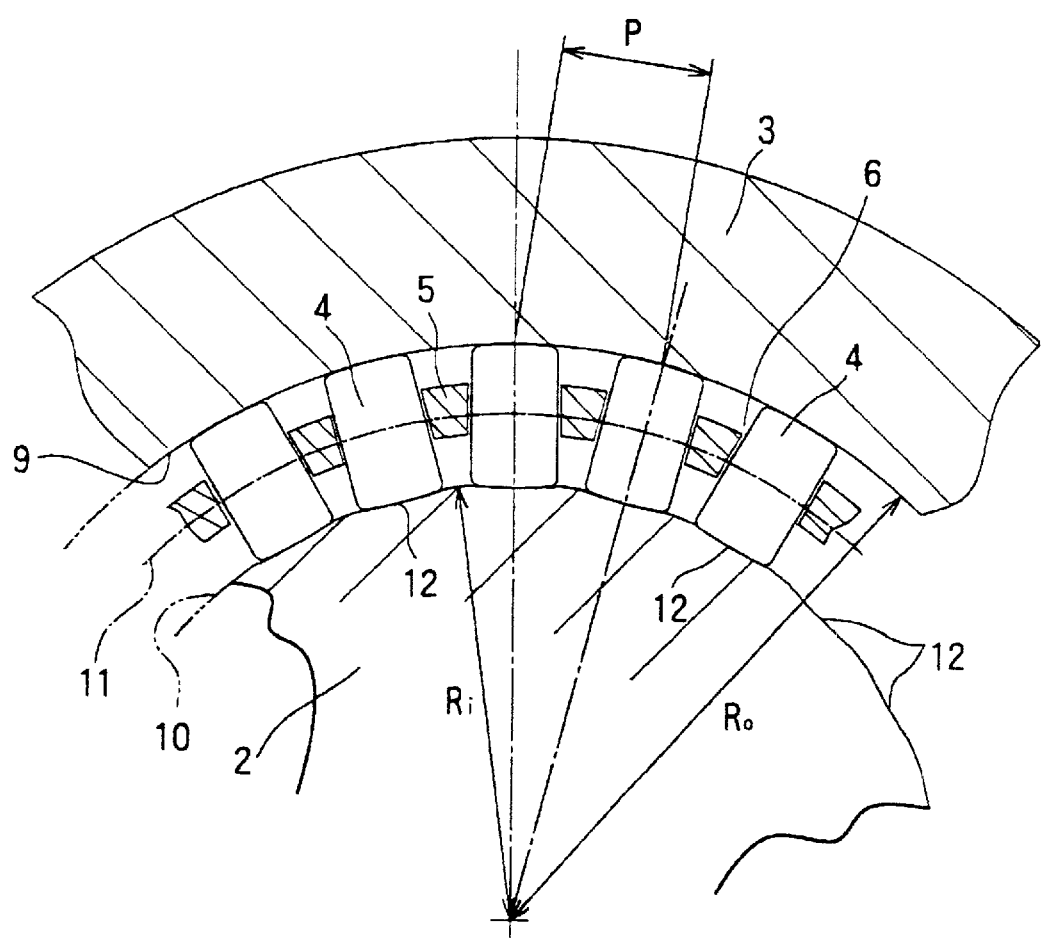
FIG. 7 is an expanded illustration showing a part of FIG. 6.
Figure 8:
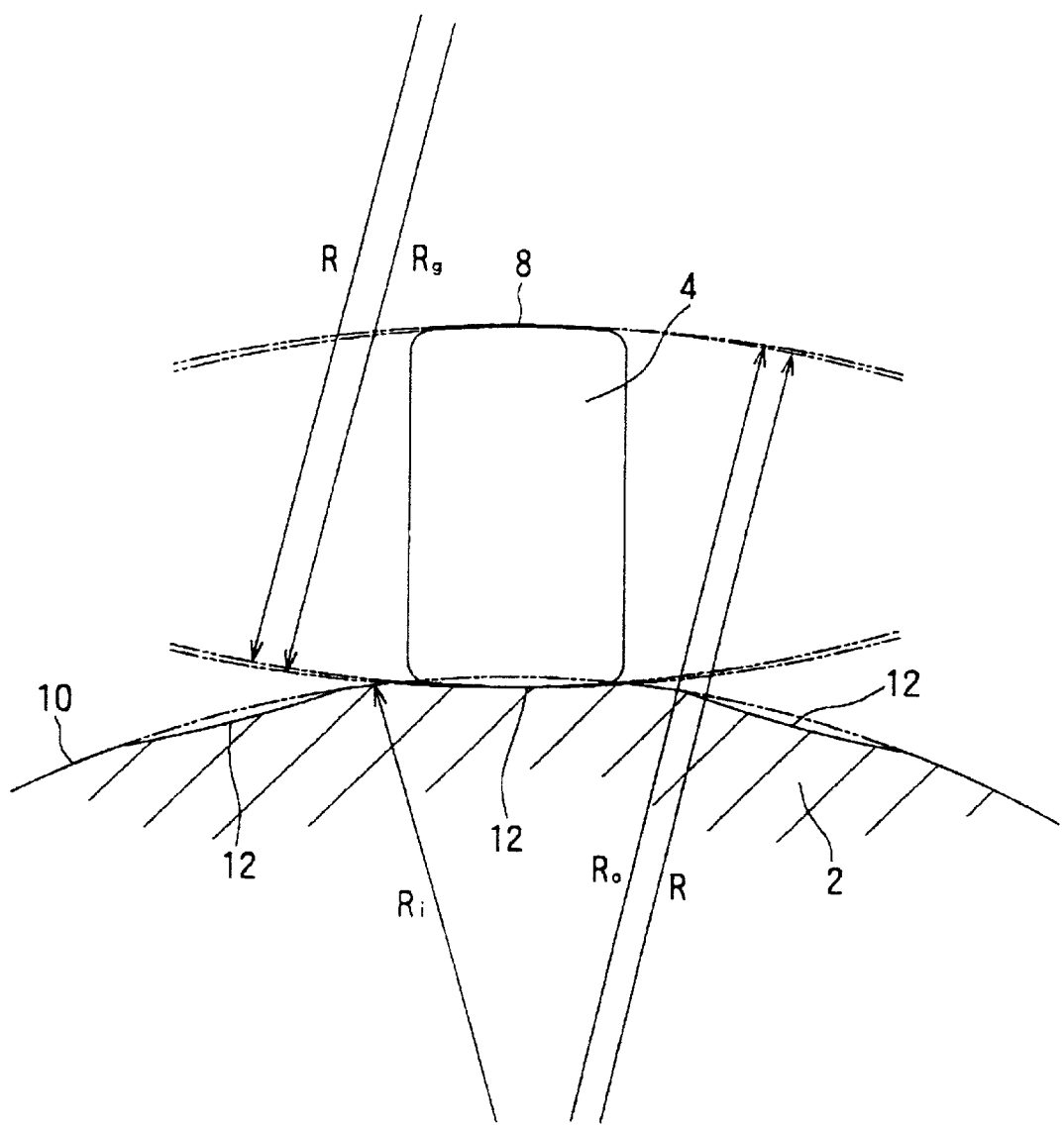
FIG. 8 is an expanded illustration showing only a roller and a part of the guide shaft only of FIG. 6.

Furthermore, in this embodiment, the width of each roller 4 is kept smaller than the diameter of the roller. As shown in FIG. 4, if the diameter of each roller 4 is φD and the width of each roller 4 is B, then the relation between them can be expressed by the following formula:

$$B < \phi D$$

In this embodiment, B is set at 0.6×ϕD, but the width can be set adequately, needless to say.

Moreover, in this embodiment, the pitch of the rollers 4 disposed in the circumferential direction is set to be smaller than twice the width B of each roller 4. That is, if the pitch is P, the relation between pitch P and width B can be expressed by the following formula:

$$P < 2 \times B$$

In the linear bearing 1 of this invention constituted as described above, the following action can take place.

In the linear bearing 1, the circular arc surfaces of revolution 8 of the rollers 4 contact the inner cylindrical surface 9 of the outer cylinder 3 and the outer surface 10 of the guide shaft 2. Since the radius R of the circular arc surface of revolution 8 of each roller 4 is slightly smaller than the radius Ro of the inner cylindrical surface of the outer cylinder 3, or suitably kept at 93% to 96% of the radius Ro of the cylindrical surface as described above, the contacts between them are substantially line contacts. Therefore, compared with the linear bearing using balls as rolling elements, the rigidity can be enhanced.

Furthermore, since the pitch P of the rollers 4 disposed in the circumferential direction is kept smaller than twice the width B of each roller 4, more rollers 4 can be disposed along the circumference with the same diameter (indicated by a one-dot-dash line and given symbol 11 in the drawing), compared with the conventional constitution in which the pitch P of the rollers 4 is larger than twice the width B of each roller 4. Therefore, this constitution allows the contact area to be increased.

So, compared with the conventional constitution in which the pitch P of the rollers disposed in the circumferential direction is larger than twice the width B of each roller 4, higher rigidity can be achieved if the diameter of the circumference along which the rollers 4 are disposed is the same, or the diameter of the circumference can be made smaller, that is, the outer cylinder 3 can be downsized, if it is intended to achieve equivalent rigidity.

Moreover, in this embodiment, since the width B of each roller 4 is kept smaller than the diameter ϕD of the roller, fuirther more rollers 4 can be disposed along the circumference 11 with the same diameter. So, further higher rigidity can be achieved if the diameter of the circumference along which the rollers are disposed is the same, or the diameter of the circumference can be made farther smaller, that is, the outer cylinder can be furter downsized, if it is intended to achieve equivalent rigidity.

Furthermore, in this embodiment having the above-mentioned features, since it is only required that the inner surface 9 of the outer cylinder 3 and the outer surface 10 of the guide shaft 2 are forned as cylindrical surfaces, the forming work is easy, to keep the production cost low.

Still firthermore, because of the constitution in which the inner surface 9 of the outer cylinder 3 and the outer surface 10 of the guide shaft 2 are formed as cylindrical surfaces and in which the circular arc surfaces of revolution 8 of the rollers 4 contact those cylindrical surfaces, the outer cylinder 3 and the guide shaft 2 can rotate relatively to each other around the axis, that is, the relative motion around the axis is free. So, the linear bearing can be easily assembled with a mating apparatus.

FIGS. 5 through 8 show a second embodiment of this invention.

The general constitution of this embodiment is similar to the constitution of the above-mentioned first embodiment, but is different only in the outer surface 10 of the guide shaft 2 as described below. Therefore, the components of the second embodiment corresponding to the components of the first embodiment are given the same symbols as given to the components shown in FIGS. 1 through 4, to avoid twice explanation.

In the second embodiment, the outer surface 10 of the guide shaft 2 is provided with axially extending guide grooves 12, each having a concave cylindrical surface, corresponding to the respective rows of rollers 4 disposed in the axial direction. That is, in this embodiment, twenty-four guide grooves 12 are formed around the guide shaft 2. The radius Rg of the circle constituting the concave cylindrical surface of each guide groove 12 is set to be slightly larger than the radius R of the circle constituting the circular arc surface of revolution 8 of each roller 4. For example, suitably, Rg is set at 1.04 to 1.08 times the radius R. Therefore, the radius Rg can also be kept equal to the radius Ro of the circle constituting the cylindrical surface 9 of the outer cylinder 3, or may also be different as required.

In the linear bearing of this embodiment, since the circular arc surfaces of revolution 8 formed on the cylindrical surfaces of the rollers 4 contact the inner surface 9 of the outer cylinder 3 and the guide grooves 12 of the guide shaft 2 substantially as line contacts, the rigidity can be further enhanced compared with the first embodiment of this invention.

In the linear bearing of this embodiment, the guide grooves 12, each having a concave cylindrical surface, are formed on the guide shaft 2, to further enhance the rigidity as described above. However, since it is only required that the guide grooves 12 are formed on the outer surface 10 of the guide shaft 2, the pitch accuracy of the guide grooves 12 around the guide shaft 2 is not so important, and the machining work is easy. In addition, the inner surface 9 of the outer cylinder 3 is formed as a cylindrical surface. So, the outer cylinder 3 and the guide shaft 2 can rotate relatively to each other around the axis, that is, the relative motion around the axis is free. Therefore, the linear bearing can be easily assembled with a mating apparatus.

INDUSTRIAL APPLICABILITY

Since this invention is as described above, it can provide a linear bearing that has higher rigidity, can be produced easily, is lower in production cost, and can be easily assembled with a mating apparatus, compared with the conventional linear bearings.

What is claimed is:

1. A linear bearing, comprising a guide shaft, an outer cylinder axially movable relative to the guide shaft outside the guide shaft, a plurality of rolling elements interposed between the guide shaft and the outer cylinder, a cage provided between the guide shaft and outer cylinder for retaining said rolling elements disposed in the circumferential direction and in the axial direction, said rolling elements having a convex circular arc surface of revolution formed on the cylindrical surface thereof, an inner surface of the outer cylinder and an outer surface of the guide shaft being formed as cylindrical surfaces, respectively, the radius of the circle constituting the circular arc surface of revolution of each of said rollers being slightly smaller than the radius of the circle constituting the cylindrical surface of the outer cylinder, and the pitch of the rollers disposed in the circular direction being smaller than twice the width of each roller.

2. A linear bearing according to claim 1, wherein the width of each of the rollers is smaller than the outer diameter of the roller.

3. A linear bearing according to claim 2, wherein the radius of a circle constituting the circular arc surface of revolution of each of the rollers is from 93% to 96% of the radius of the circle constituting the cylindrical surface of the outer cylinder.

4. A linear bearing according to claim 1, wherein the radius of a circle constituting the circular arc surface of revolution of each of the rollers is from 93% to 96% of the radius of the circle constituting the cylindrical surface of the outer cylinder.

5. A linear bearing comprising a guide shaft, an outer cylinder axially movable relative to the guide shaft outside the guide shaft, a plurality of rolling elements interposed between the guide shaft and the outer cylinder, a cage provided between the guide shaft and outer cylinder for retaining said rolling elements disposed in the circumferential direction and in the axial direction, said rolling elements having a convex circular arc surface of revolution formed on a cylindrical surface thereof, the inner surface of the outer cylinder being formed as a cylindrical surface, the outer surface of the guide shaft having axially extending guide grooves, each of which having a concave cylindrical surface, corresponding to the respective rows of rollers disposed in the axial direction, the radius of the circle constituting the circular arc surface of revolution of each of the rollers being slightly smaller than the radius of the circle constituting the cylindrical surface of the outer cylinder and the radius of the circle constituting the concave cylindrical surface of each of the grooves in the guide shaft, the pitch of the rollers disposed in the circumferential direction being smaller than twice the width of each roller, and the radius of a circle constituting the concave cylindrical surface of each of the guide grooves being from 1.04 to 1.08 times the radius of a circle constituting the circular arc surface of revolution of each of the rollers.

6. A linear bearing comprising a guide shaft, an outer cylinder axially movable relative to the guide shaft outside the guide shaft, a plurality of rolling elements interposed between the guide shaft and the outer cylinder, a cage provided between the guide shaft and outer cylinder for retaining said rolling elements disposed in the circumferential direction and in the axial direction, said rolling elements having a convex circular arc surface of revolution formed on a cylindrical surface thereof, the inner surface of the outer cylinder being formed as a cylindrical surface, the outer surface of the guide shaft having axially extending guide grooves, each of which having a concave cylindrical surface, corresponding to the respective rows of rollers disposed in the axial direction, the radius of the circle constituting the circular arc surface of revolution of each of the rollers being slightly smaller than the radius of the circle constituting the cylindrical surface of the outer cylinder and the radius of the circle constituting the concave cylindrical surface of each of the grooves in the guide shaft, the pitch of the rollers disposed in the circumferential direction being smaller than twice the width of each roller, and the radius of a circle constituting the circular arc surface of revolution of each of the rollers being from 93% to 96% of the radius of the circle constituting the cylindrical surface of the outer cylinder.

7. A linear bearing comprising a guide shaft, an outer cylinder axially movable relative to the guide shaft outside the guide shaft, a plurality of rolling elements interposed between the guide shaft and the outer cylinder, a cage provided between the guide shaft and outer cylinder for retaining said rolling elements disposed in the circumferential direction and in the axial direction, said rolling elements having a convex circular arc surface of revolution formed on a cylindrical surface thereof, the inner surface of the outer cylinder being formed as a cylindrical surface, the outer surface of the guide shaft having axially extending guide grooves, each of which having a concave cylindrical surface, corresponding to the respective rows of rollers disposed in the axial direction, the radius of the circle constituting the circular arc surface of revolution of each of the rollers being slightly smaller than the radius of the circle constituting the cylindrical surface of the outer cylinder and the radius of the circle constituting the concave cylindrical surface of each of the grooves in the guide shaft, the pitch of the rollers disposed in the circumferential direction being smaller than twice the width of each roller, and the radius of a circle constituting the concave cylindrical surface of each of the guide grooves being from 1.04 to 1.08 times the radius of a circle constituting the circular arc surface of revolution of each of the rollers, and the radius of a circle constituting the concave cylindrical surface of each of the guide grooves of the guide shaft being equal to the radius of a circle constituting the cylindrical surface of the outer cylinder.

8. A linear bearing comprising a guide shaft, an outer cylinder axially movable relative to the guide shaft outside the guide shaft, a plurality of rolling elements interposed between the guide shaft and the outer cylinder, a cage provided between the guide shaft and outer cylinder for retaining said rolling elements disposed in the circumferential direction and in the axial direction, said rolling elements having a convex circular arc surface of revolution formed on a cylindrical surface thereof, the inner surface of the outer cylinder being formed as a cylindrical surface, the outer surface of the guide shaft having axially extending guide grooves, each of which having a concave cylindrical surface, corresponding to the respective rows of rollers disposed in the axial direction, the radius of the circle constituting the circular arc surface of revolution of each of the rollers being slightly smaller than the radius of the circle constituting the cylindrical surface of the outer cylinder and the radius of the circle constituting the concave cylindrical surface of each of the grooves in the guide shaft, the pitch of the rollers disposed in the circumferential direction being smaller than twice the width of each roller, and the radius of a circle constituting the concave cylindrical surface of each of the guide grooves being from 1.04 to 1.08 times the radius of a circle constituting the circular arc surface of revolution of each of the rollers, and the radius of a circle constituting the concave cylindrical surface of each of the guide grooves of the guide shaft differs from the radius of the circle constituting the cylindrical surface of the outer cylinder.

* * * * *